United States Patent [19]

Spoo et al.

[11] Patent Number: 5,653,923
[45] Date of Patent: Aug. 5, 1997

[54] METHOD FOR MAKING SHAPED MEMBERS USING A FOAM FROTH

[75] Inventors: Kevin J. Spoo, Granville; Arthur Blinkhorn, Westerville; Vyacheslav S. Grinshpun, Granville, all of Ohio; George Smith, Sugarloaf, Pa.; Terry Beaver, Newark, Ohio

[73] Assignee: Owens-Corning Fiberglas Technology, Inc., Summit, Ill.

[21] Appl. No.: 608,870

[22] Filed: Feb. 29, 1996

[51] Int. Cl.$^6$ .............................. B29C 44/24; B29C 44/32
[52] U.S. Cl. .............. 264/46.1; 264/46.4; 264/46.6; 264/50; 264/129; 264/148; 264/151; 264/260; 156/79
[58] Field of Search ..................... 264/257, 46.4, 264/46.6, 46.5, 129, 145, 50, 148, 45.9, 46.1, 260, 151; 156/79

[56] References Cited

U.S. PATENT DOCUMENTS

| | | | |
|---|---|---|---|
| 3,286,004 | 11/1966 | Hill et al. | 264/46.6 |
| 3,867,221 | 2/1975 | Chant | 264/46.4 |
| 3,954,926 | 5/1976 | Pahl et al. | 264/46.4 |
| 3,989,781 | 11/1976 | Chant | 264/46.4 |
| 4,130,614 | 12/1978 | Saidla | 264/46.4 |
| 4,340,558 | 7/1982 | Hendrickson . | |
| 4,444,709 | 4/1984 | Hayashi et al. . | |
| 4,681,722 | 7/1987 | Carter et al. . | |
| 4,715,575 | 12/1987 | Preston | 264/46.4 |
| 4,762,740 | 8/1988 | Johnson et al. | 264/263 |
| 4,769,202 | 9/1988 | Eroskey et al. . | |
| 4,891,176 | 1/1990 | Drysdale et al. | 264/257 |
| 5,173,227 | 12/1992 | Ewen et al. | 264/46.6 |
| 5,229,056 | 7/1993 | De Meyer et al. . | |
| 5,286,320 | 2/1994 | McGrath et al. . | |
| 5,338,497 | 8/1994 | Murray et al. | 264/257 |
| 5,366,773 | 11/1994 | Schroll et al. . | |

Primary Examiner—Allan R. Kuhns
Attorney, Agent, or Firm—C. Michael Gegenheimer; Linda S. Evans

[57] ABSTRACT

This invention produces three-dimensional shapes such as window lineals by first lining a foam die with a continuously moving reinforcing veil. Once the veil is in the foam die, a foam is blown into the die. The foam expands in the die forcing the veil against the die wall. The veil is selected so that the foam never fully penetrates the veil, but adheres to it. The material exiting the foam die is now properly shaped to enter the curing die. Resin is then injected onto the foam core where it penetrates the veil, is cured in the heated curing die and exits as a finished product of a plastic skin adhered to a foam core with a veil sandwiched therebetween.

13 Claims, 2 Drawing Sheets

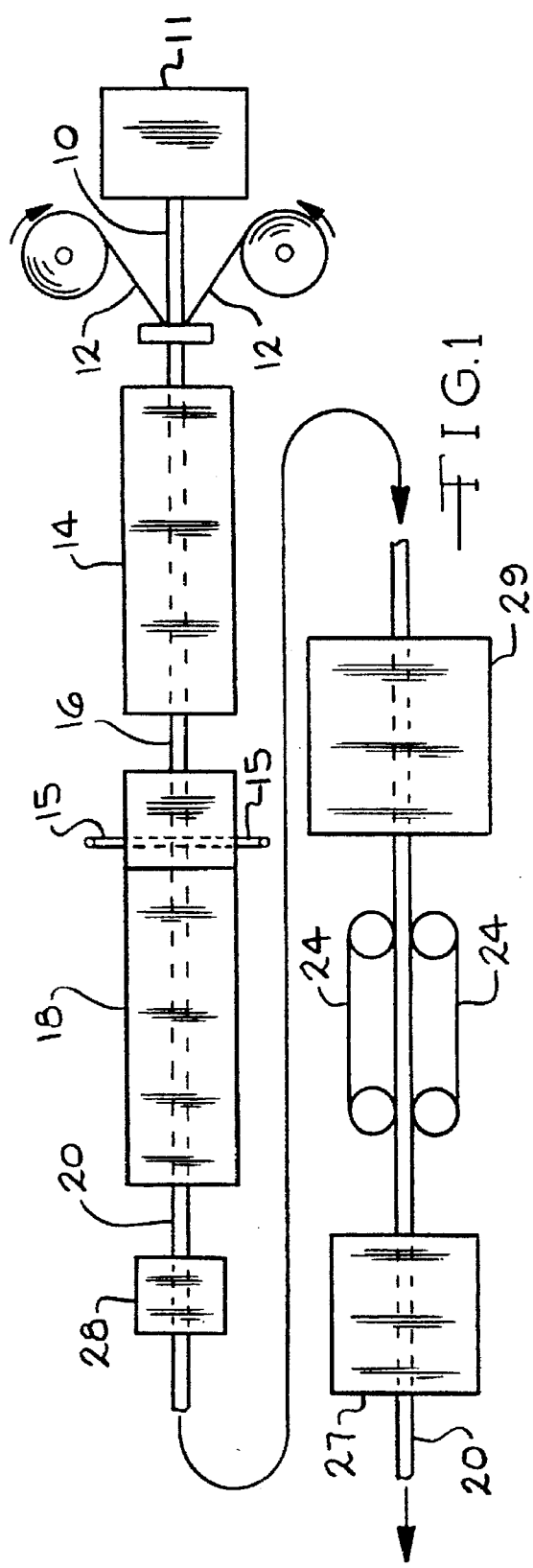
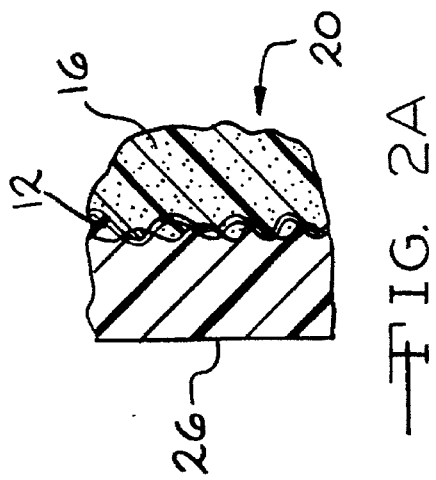
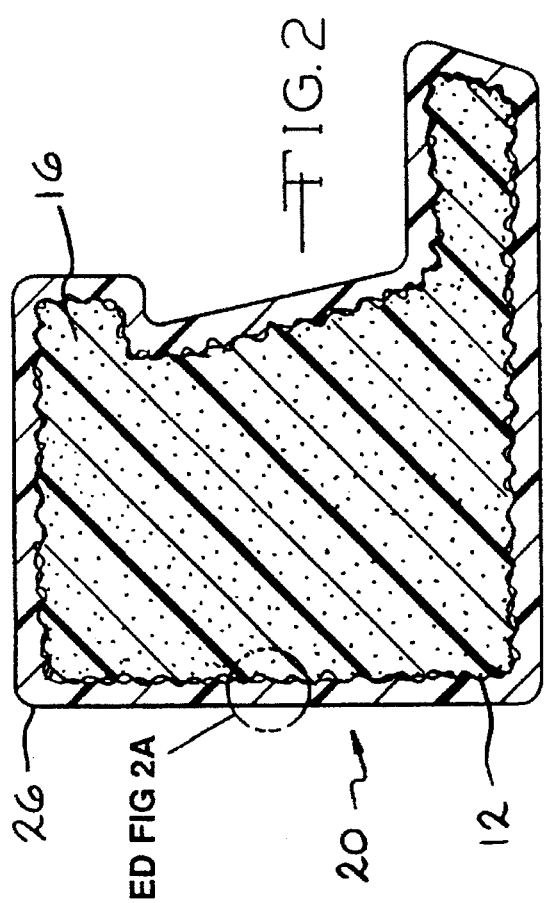

METHOD FOR MAKING SHAPED MEMBERS USING A FOAM FROTH

TECHNICAL FIELD

This invention relates to a method for making shaped members having a cured resinous skin and a foam substrate or core. More specifically, the invention relates to processes of foam extrusion with pultrusion in order to manufacture lightweight, thin skinned, pultruded composites with foam cores.

BACKGROUND ART

Attempts to pultrude a fiber reinforced plastic (FRP) skin onto a preformed light density foam core board have been largely ineffective. One of the major problems of such attempts has been the friability of the foam material when subjected to the pressure of the pultrusion process. Without a significant amount of pressure, the FRP skin will be cosmetically unacceptable.

One method has been developed for manufacturing a composite sandwich structure by pultrusion of a skin of liquid resin and reinforcement materials on the surface of a preformed foam core. As the liquid resin and foam core are pulled through the pultrusion die, the liquid resin and the surface region of the foam core are heated to convert water in the foam core to steam, thereby causing water vapor pressure expansion of the foam core. The pultrusion die constrains the liquid resin so that the expansion of the foam core subjects the liquid resin to increased pressure, thereby forcing the liquid resin to penetrate and wet the reinforcement materials and to partially penetrate the foam core. See U.S. Pat. No. 5,286,320.

The use of foam panels in the pultrusion process still requires preformed boards. Typically, foam board is purchased in 4'×8' sheets, trimmed to size and fed into the pultrusion process. This method either limits the pultrusion process to simple rectangular shapes of low cost or destroys the favorable economics with a foam shaping operation with subsequent foam scrap. This process also requires, in the pultrusion process, temperatures of at least 100° C. and excessive water vapor expansion pressures. As a result, this pultrusion process is limited to producing hollow shapes with wall thicknesses of 0.070" or greater.

DISCLOSURE OF INVENTION

This process we invented produces three-dimensional shapes with wall thicknesses down to 0.025" which still survives processing.

This invention 1) produces a foam core in the appropriate shape with no waste; 2) allows for varying of foam density to suit process needs; 3) allows a wider variety of foam chemistry to suit insulating and structural needs; 4) provides a means of preventing foam from sticking to the extrusion die without creating carrier film waste; 5) promotes adhesion of the resin skin to the foam; and 6) allows the pultrusion process to produce very thin wall parts at very low costs.

The key feature of this process is the use of a semi-permeable fibrous cloth which is used as the carrier film. This cloth is shaped to fit the cross-section of the foam die. The cloth shape also is constrained by strategically placed rovings which serve to force the veil into tight corners and to reinforce the foam. Once in the foam die, a foam is blown into the die. The foam expands in the die forcing the veil against the die wall. The veil and foam are selected so that the foam never fully penetrates the veil, but adheres to it. The material exiting the foam die is now properly shaped to enter the curing die. Additional reinforcements are folded around the core and enter a curing die. Resin is then injected onto the foam core where it penetrates the reinforcements, is cured in the heated curing die and exits as a finished product.

BRIEF DESCRIPTION OF DRAWINGS

FIG. 1 is a schematic view in elevation of an apparatus for making shaped members according to the method of the invention.

FIG. 2 is an enlarged fragmentary sectional view of a shaped member constructed in accordance with the invention.

FIG. 2A is an enlarged fragmentary sectional view showing the penetration of foam and resin into the veil.

BEST MODE FOR CARRYING OUT THE INVENTION

Figure 3:
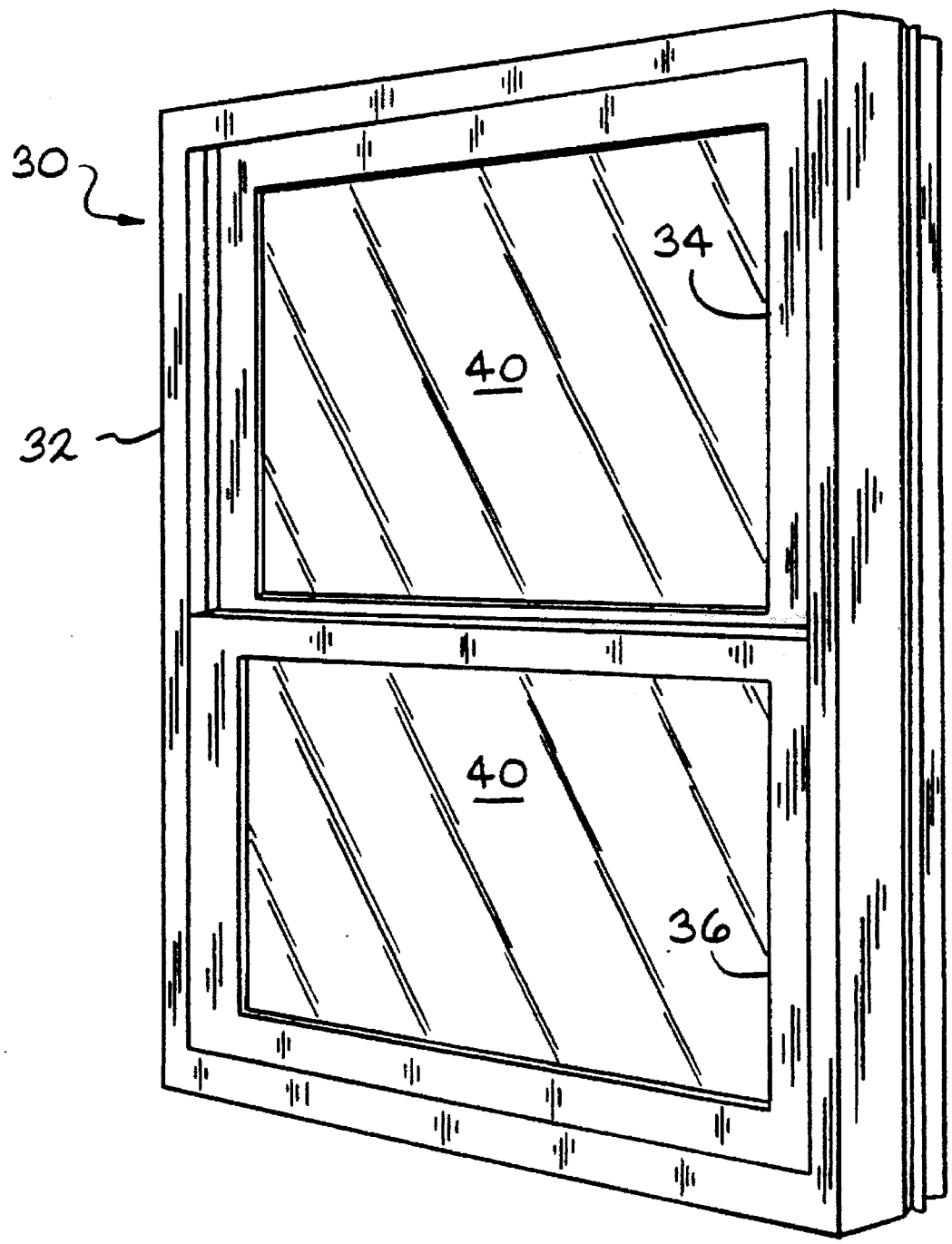
FIG. 3 is an elevational perspective view of a double-hung window frame and sash constructed of members made in accordance with the invention.

Our invention is a method of making a shaped member comprising the steps of providing a foam die having a cavity, the cavity having inner walls, lining a portion of the inner walls with a reinforcing veil or veils, the reinforcing veil having an inner and outer surface, filling the cavity with an expandable foam material, expanding the foam material into a foam, the foam forcing the veil against the inner walls of the cavity and the foam adhering to the inner surface of the reinforcing veil, advancing the veiled foam from the foam die into a curing die having a cavity, the cavity having a larger dimension than the veiled foam, the curing die cavity and veiled foam forming a space, filling the space with a liquid resin which penetrates the outer surface of the veil and curing the liquid resin to form a skin adhered to the outer surface of the veil, thereby forming a shaped member having a cured resin adhered to a cured foam.

Preferably, our invention includes the steps of completely lining the inner walls of the foam die with the reinforcing veil or veils so that the veil circumscribes the foam and positioning the veiled foam in the curing die so that the space in the curing die completely circumscribes the veiled foam so that the shaped member has a cured resin skin surrounding a cured foam core.

FIG. 1 shows expandable foam material 10 leaving foam extruder 11. Foam material 10 and reinforcing veil 12 entering foam die 14 simultaneously. Foam die 14 forms a cavity (not shown). Foam material 10 expands into foam 16 and forces veil 12 against the inner walls (not shown) of the cavity. Foam 16 expands which causes it to penetrate and adhere to veil 12. Preferably, foam 16 is a phenolic foam and ideally, has a bursting pressure of at least 10 psi (69 kPa), as well as comparatively low water absorption and high resiliency. Most preferably, the foam is a phenolic foam having a density within the range from about 2.0 pounds per cubic foot (pcf) (32 kg/m$^3$) to about 3.0 pcf (48K/m$^3$). Preferably, veil 12 is made of polyester fibers. Veil 12, however, can be any combination of rovings, mats, woven fabrics, or veils composed of such fibers as glass fibers, aramid fibers, carbon fibers, graphite fibers and ceramic fibers.

Upon leaving foam die 14, foam 16 and veil 12 are pulled through curing die 18 where the liquid resin is applied through resin injectors 15 and cured to form a resin skin. The resulting cured composite structure, which is indicated as panel 20, is pulled by any suitable traction or pulling device, such as traction drive 24. Subsequently, cured panel 20 can be sawed off by any suitable means such as cutter 27 into individual panels. Paint die 28 and paint curing oven 29 put a finish coat on panel 20.

Curing die 18 has a central passageway extending therethrough for receiving foam 16. Several passageways transverse to the central passageway meter polyester resin compound from a constant delivery pump (not shown) to provide a uniform thickness of resin impregnation in outer surface portions thereof all around a cross-section thereof and all along the length thereof. The resin thus impregnated is cured as skin 26 (see FIG. 2) in curing die 18 to provide an essentially non-porous surface on foam 16.

While we prefer skin 26 be made from polyester resin and have a smooth surface, the liquid resin can be any thermosetting resin such as phenolic resole or novolac type resin. The resin must be capable of curing to form a smooth skin and a hard finish on the finished panel. The preferred resin is a polyester resin, although other resins such as phenolits and epoxies can be used. Accelerating agents, compatabilizing agents, fillers, mold release agents, second phenolic phases for toughening and coloring agents can be added to the resin, as will be appreciated by those skilled in the art.

FIG. 2 shows the resulting panel 20. Panel 20 usually is a shaped member 20 as shown in FIG. 2. Shaped member 20 includes foam core 16, polyester veil 12 and polyester skin 26.

FIG. 2A shows the penetration of foam 16 and skin 26 into veil 12.

FIG. 3 illustrates a double-hung window 30, including a frame 32 and upper and lower window sashes 34 and 36 constructed of the shaped members of present invention. Each of frame 32 and sashes 34 and 36 has straight top, bottom and opposite side members. Each sash 34 and 36 is shown with an insulating glass unit 40 although removable double glazing may be used instead.

For a detailed discussion of pultrusion technology, reference is directed to "Handbook of Pultrusion Technology" by Raymond W. Meyer, first published 1985 Chapman & Hal, New York.

While we prefer a polyester veil in the foaming die, other reinforcements may be used. For example, roving or tow, which is similar to a yarn, provides a continuous fiber reinforcement, which is aligned axially along the longitudinal axis of the pultruded member. Typically, the rovings are fiberglass, but they may be of other fibers as well, such as carbon, aromatic polyamide fibers such as Kevlar™ or any fiber that can be used as a reinforcing component. Mat reinforcements, which may be woven or nonwoven, provide fibers that are both axially and non-axially oriented in a thin layer. Such construction enhances transaxial mechanical properties as well as improves surface properties by enhancing abrasion resistance, weather resistance, etc. As with the rovings, the mat reinforcement may be selected from virtually any suitable fibrous material that is capable of withstanding the temperatures required in the pultrusion process. Typically, they are fiberglass, polyester, nylon, propylene, polyimide and the like.

Any suitable polymer matrix may be employed in the skin. The polymer may be insulating or conducting. If cross-directional electrical connection is desired along the edges of the pultrusion, a conducting polymer or conductive additives to the polymer or conductive additives to the reinforcement may be used. Conversely, if insulating properties are desired along the edges of the pultrusion, an insulating polymer may be used, or insulating fibers can be used in the outer periphery of the pultruded configuration and conducting fibers can be configured to reside away from the edges.

Typically, the polymer is selected from the group of structural thermoplastic and the thermosetting resins. Polyesters, epoxies, vinyl esters, polyetherketones, polyetherimides, polyethersulphones, high density polyethylenes, polycarbonates, acrylonitrile-butadiene-styrenes (ABS), polypropylene and nylon are, in general, suitable materials, with the thermosetting polyesters being preferred due to their short cure time, relative chemical inertness and low cost. If an elastomeric matrix is desired, a silicone, fluorosilicone or polyurethane elastomer may be chosen for the polymer matrix.

The thermosetting resin for the skin preferably is an unsaturated polyester which comprises the polycondensation reaction product of one or more dihydric alcohols and one or more ethylenically unsaturated polycarboxylic acids. Polycarboxylic acid generally means polycarboxylic or dicarboxylic acids or anhydrides, polycarboxylic or dicarboxylic acid halides and polycarboxylic or dicarboxylic esters. Suitable unsaturated polycarboxylic acids, and the corresponding anhydrides and acid halides that contain polymerizable carbon-to-carbon double bonds, may include maleic anhydride, maleic acid and fumaric acid. A minor proportion of the unsaturated acid, up to about forty mole percent, may be replaced by dicarboxylic or polycarboxylic acid that does not contain a polymerizable carbon-to-carbon bond. Examples of such acids include o-phthalic, isophthalic, terephthalic, succinic, adipic, sebacic, methylsuccinic, and the like. Dihydric alcohols that are useful in preparing the polyesters include 1,2-propanediol (hereinafter referred to as propylene glycol), dipropylene glycol, ethenylene glycol, 1,3-butanediol, ethylene glycol, glycerol and the like. Examples of suitable unsaturated polyesters are the polycondensation products of 1) propylene glycol and maleic and/or fumaric acids; 2) 1,3-butanediol and maleic and/or fumaric adds; 3) combinations of ethylene and propylene glycols (approximately 50 mole percent or less of ethylene glycol) and maleic and/or fumaric acid; and 4) propylene glycol, maleic and/or fumaric acids and dicyclopentadiene reaction with water.

EXAMPLE 1

Preparation of Resole

The resole resin used in the production of these foams used a formaldehyde:phenol (F/P) mole ratio of 2.3:1, using 52% formaldehyde and 99% phenol. The reaction was carried out under basic conditions at elevated temperatures with 50% caustic solution. When the Ostwald viscosity of the resin reached 62 cst (measured at 25° C.), the reaction was cooled and neutralized with 50% aqueous aromatic sulphonic acid. Urea was added as a formaldehyde scavenger at a level of 77% by mole of the residual formaldehyde. The resin was passed through a thin film evaporator to reduce the water content from about 30% to 4–8%. A 50/50 blend by mass of an ethylene oxide based nonionic surfactant Pluronic F127 from BASF and Harfoam PI from Huntsman Chemical Co. was then added in the molten state at 3.5% by weight of the resin and mixed into the resin to form a homogeneous mixture. The final viscosity of the resin was 9000–12000 cps (measured at 40° C.).

EXAMPLE 2

Preparation of Resole Foam

The resole foam was prepared by mixing together the resole resin and surfactant with the blowing agent and acid catalyst using a high shear, short residence, rotor/stator continuous mixer. The blowing agent was saturated with nitrogen at 200 psi prior to introduction to the high shear mixer. The foaming catalyst was a blend of resorcinol, diethylene glycol, and a mixture of xylene and toluene sulphonic acids. (See U.S. Pat. Nos. 4,883,824 and 4,945, 077). The resole resin, blowing agent, and catalyst were continuously metered to the mixer by means of suitable flow metering devices in the following ratios:

| | |
|---|---|
| resin/surfactant | 100 |
| blowing agent | 7.43 |
| catalyst | 11.8 |

EXAMPLE 3

The foamable mixture and polyester veil, Nexus from Precision Formed Fabrics, were metered into foam die 14. Foamable mixture 10 (resin/surfactant, blowing agent, catalyst) exited die 14 through nozzles to form a continuous froth between moving veils 12. This resulted in foam 16 which knitted together with veil 12, as the froth expanded, to form a continuous sheet.

EXAMPLE 4

The phenolic foam 16 was supplied to die curing 18. The phenolic foam had a density of 2.5 pcf(40 kg/m$^3$) and the cross-sectional area was 1⅝ inches thick (4 cm) by one foot wide (30 cm). The foam and veil were pulled through the die at a speed of approximately one foot per minute (0.3 meters per minute).

In the resin injection zone, a catalyzed polyester resin was injected at a temperature of about 50° C. During the curing of the resin skin, the maximum temperature of the surface region of the foam core reached 167° C. By the time the foam core reached the outlet of the die, the temperature of the surface region of the foam core had been reduced to 95° C.

The resulting continuous panel was cut into lengths. The R-Value of the panel was measured to be 8.3/inch.

The polyester skin was a polycondensation product of propylene glycol, maleic anhydride and fumaric acid.

We claim:

1. A method of making a shaped member, comprising the steps of:

(a) extruding an expandable foam material from an extruder;

(b) continuously forming a composite foam by introducing the expandable foam material from the extruder together with a reinforcing veil into a foam die defining a cavity having inner walls, the reinforcing veil having an outer surface lining at least a portion of the inner walls and an inner surface surrounding at least a portion of the expandable foam material, continuously moving the reinforcing veil through the foam die while forcing the expandable foam material through nozzles to form a continuous foam froth surrounded by the moving reinforcing veil, and expanding the foam material to form a foam core that forces the veil against the inner walls of the cavity, with the foam material adhering to the inner surface of the reinforcing veil to yield a composite foam;

(c) pulling the composite foam from the foam die through a curing die; and (d) pultruding a continuous shaped member by injecting a liquid resin into the curing die to impregnate the composite foam and curing the liquid resin in the curing die to form a resin skin on the composite foam.

2. A method according to claim 1, wherein the shaped member has a wall thickness of about 0.025 inch.

3. A method according to claim 1, further comprising the steps of:

(e) coating the continuous shaped member with paint; and (f) curing the paint.

4. A method according to claim 3, further comprising the step of:

(g) cutting the continuous shaped member into lengths to form cut members.

5. A method according to claim 4, wherein the cut members are panels in the shape of a window sash or frame.

6. A method according to claim 1, wherein the reinforcing veil is made from polyester fibers and the expandable foam material is a phenolic foam material.

7. A method according to claim 6, wherein the liquid resin is a thermosetting polyester.

8. A method according to claim 1, wherein the liquid resin is selected from the group consisting of polyesters, epoxies, vinyl esters, polyetherketones, polyetherimides, polyethersulphones, high density polyethylenes, polycarbonates, acrylonitrile-butadiene-styrenes, polypropylene, and nylon.

9. A method according to claim 1, wherein the reinforcing veil is a fibrous roving or mat material.

10. A method according to claim 1, wherein the reinforcing veil is made from glass fibers, carbon fibers, aromatic polyamide fibers, nylon fibers, propylene fibers, or polyimide fibers.

11. A method according to claim 1, wherein the expandable foam material is a phenolic or polyurethane foam.

12. A method according to claim 1, wherein the continuous forming step (b) includes lining completely the inner walls of the foam die with the outer surface of the reinforcing veil and circumscribing completely the expandable foam material with the inner surface of the reinforcing veil.

13. A method according to claim 1, wherein the expandable foam material comprises a resole resin, a surfactant, a blowing agent, and a catalyst.

* * * * *